United States Patent
Frenal et al.

(10) Patent No.: US 8,701,723 B2
(45) Date of Patent: Apr. 22, 2014

(54) FILLER COUPLING AND CORRESPONDING RECEPTACLE AND FILLING METHOD

(75) Inventors: Antoine Frenal, Ezanville (FR); Cyrill Manscourt, Paris (FR); Philippe Pisot, L'Isle Adam (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 460 days.

(21) Appl. No.: 13/176,531

(22) Filed: Jul. 5, 2011

(65) Prior Publication Data

US 2012/0006445 A1    Jan. 12, 2012

(30) Foreign Application Priority Data

Jul. 9, 2010    (FR) ...................................... 10 55605

(51) Int. Cl.
 *B65B 1/04*    (2006.01)
(52) U.S. Cl.
 USPC ............... 141/347; 141/4; 141/349; 141/353; 141/286; 137/512
(58) Field of Classification Search
 USPC ............. 141/4, 347, 348, 349, 351, 353, 286; 137/512
 See application file for complete search history.

(56) References Cited

U.S. PATENT DOCUMENTS

| 5,150,880 | A | * | 9/1992 | Austin et al. | ............... | 251/149.3 |
| 6,343,630 | B1 | * | 2/2002 | Dubinsky | ...................... | 141/385 |
| 6,607,007 | B1 | | 8/2003 | Hull et al. | | |

FOREIGN PATENT DOCUMENTS

| DE | 3241843 | 5/1984 |
| DE | 8713518 | 11/1987 |
| DE | 8813050 | 12/1988 |

(Continued)

OTHER PUBLICATIONS

International Search Report for PCT/FR2011/050477, mailed May 11, 2011.

(Continued)

*Primary Examiner* — Jason K Niesz
(74) *Attorney, Agent, or Firm* — Allen E. White

(57) ABSTRACT

A filler coupling comprising an isolation valve that can move relative to a seat between an upstream closing position and a downstream opening position, said isolation valve being moved to its upstream position by a return member, the coupling also comprising a dust-prevention valve placed upstream of the isolation valve, said dust-prevention valve comprising a downstream end and being able to move relative to the body between an upstream closing position and a downstream opening position, said dust-prevention valve being moved to its upstream position by a return member, characterized in that the dust-prevention valve can be moved selectively downstream either:

in a first determined downstream position opening the upstream end in which the downstream end of the dust-prevention valve does not push the upstream end of the isolation valve, or in a second determined downstream position opening the upstream end, in which the downstream end of the dust-prevention valve pushes an upstream end of the movable isolation valve in order to move the isolation valve by contact to its downstream open position, and in that the dust-prevention valve comprises one or more passageways for guiding at least a portion of the fluid stream traveling from upstream to downstream through the body of said dust-prevention valve.

15 Claims, 3 Drawing Sheets

(56) References Cited

FOREIGN PATENT DOCUMENTS

| | | |
|---|---|---|
| DE | 3912623 | 10/1990 |
| DE | 9217629 | 2/1993 |
| DE | 10159916 | 8/2004 |
| EP | 1447574 | 8/2004 |
| EP | 1530002 | 5/2005 |
| FR | 1387267 | 1/1965 |
| FR | 2214859 | 8/1974 |
| FR | 2311989 | 12/1976 |
| FR | 2898954 | 9/2007 |
| GB | 1152890 | 5/1969 |
| GB | 2319587 | 5/1998 |
| WO | WO 2009 101350 | 8/2009 |

OTHER PUBLICATIONS

Search Report for FR 1 055 605, mailed Nov. 10, 2010.
Search Report for FR 1 055 607, mailed Nov. 11, 2010.
International Search Report for PCT/FR2011/050006, mailed Mar. 22, 2011.
Search Report for FR 1 055 606, mailed Jan. 24, 2011.

\* cited by examiner

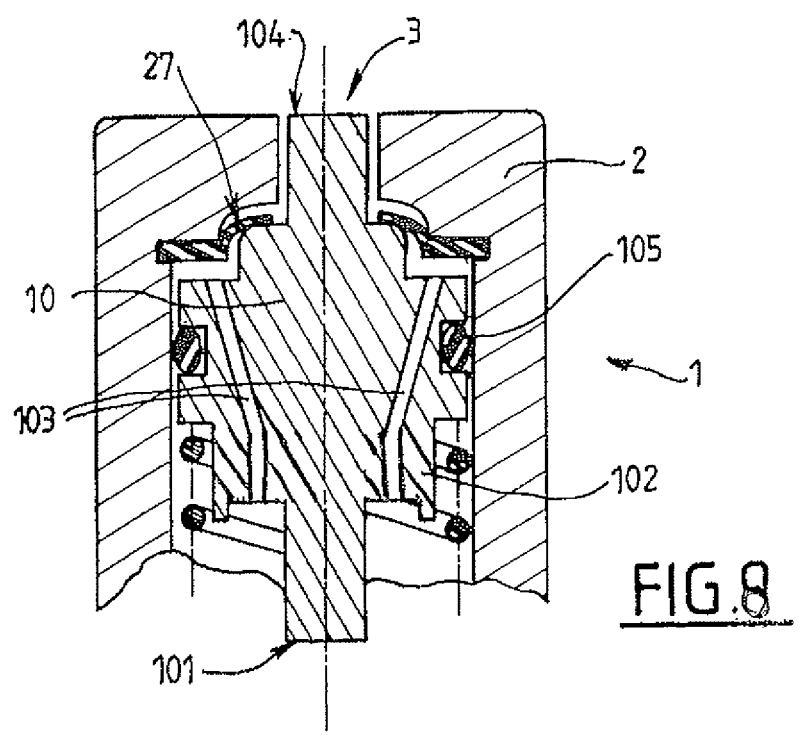

FILLER COUPLING AND CORRESPONDING RECEPTACLE AND FILLING METHOD

CROSS-REFERENCE TO RELATED APPLICATIONS

This application claims the benefit of priority under 35 U.S.C. §119 (a) and (b) to French Application No. 10 55605, filed Jul. 9, 2010, the entire contents of which are incorporated herein by reference.

BACKGROUND

1. Field of the Invention

The present invention relates to a filler coupling, a tap, a pressurized fluid receptacle and a filling method using such a coupling.

The invention relates more particularly to a filler coupling for a pressurized gas receptacle designed to interact with a packaging connector in order to allow said receptacle to be filled, the coupling comprising a body defining an internal filler circuit between an upstream end designed to be connected to a packaging connector and a downstream end designed to be connected to a receptacle, the coupling comprising an isolation valve that can move relative to a seat between an upstream position for closing the circuit and a downstream position for opening the circuit, said isolation valve being moved to its upstream position by a return member, the coupling also comprising a dust-prevention valve placed upstream of the isolation valve, said dust-prevention valve comprising a downstream end and being able to move relative to the body between an upstream position for closing the upstream end of the circuit and a downstream position for opening the circuit upstream end, said dust-prevention valve being moved to its upstream position by a return member.

The present invention concerns in particular a filler coupling comprising in series, from upstream to downstream, a dust-prevention valve and an isolation valve (the terms "upstream" and "downstream" refer to the direction of travel of the gas when filling).

The dust-prevention valve is provided notably to form a barrier upstream of the isolation valve to prevent or limit the intrusion of particles or of dust that may damage the sealing of said isolation valve.

2. Related Art

Usually, filler couplings comprise a dust-prevention plug which retracts on contact with the end of the packaging connector in order to allow the filler connector to sink into the filler coupling in order to actuate the isolation valve situated downstream in the filler coupling. This is usually a good protection against the intrusion of foreign bodies into a filler coupling. However, this protection is not usually sufficient because, when the dust-prevention valve is open, the filler connector that enters the filler coupling downstream of the dust-prevention valve can bring in particles.

Contamination of the isolation valve may cause a considerable leakage rate over the life of the product on which this filler coupling is installed. This is explained by the fact that the sealing zone of the contaminated isolation valve (dust, particles etc.) loses a large proportion of its sealing capability. This risk of intrusion of particles is increased when the filler coupling is vertical (filling from above).

A known solution consists in providing a filter for solid particles in the coupling upstream of the isolation valve. This makes it possible to trap particles or dust upstream of the isolation valve but does not make it possible to actuate the opening of the isolation valve by mechanical contact (the filter in fact forming a mechanical barrier for a valve driver).

Another solution consists in providing a filter downstream of the isolation valve. This allows the mechanical actuation of the isolation valve and provides dust protection for downstream of the isolation valve (the inside of the tap and the inside of the receptacle). However, the upstream end of the isolation valve is then subject to contamination by particles or dust that can affect its sealing.

Document WO2009101350 describes a device for filling and delivering gas from a pressurized gas tank comprising a tapping duct comprising a pressure release valve and two valves placed in series and able to be actuated by a user system for the tapping of gas. In order to fill the tank, a branch is made on a portion of the tapping duct forming a filler channel short-circuiting one of the two valves and the pressure release valve of the tapping duct.

SUMMARY OF THE INVENTION

One object of the present invention is to alleviate all or some of the drawbacks of the prior art listed above.

For this purpose, the coupling according to the invention, moreover conforming to the generic definition given to it by the above preamble, is essentially characterized in that the dust-prevention valve can be moved selectively downstream either:

in a first determined downstream position, called "contactless" position, opening the upstream end of the circuit, in which the downstream end of the dust-prevention valve does not push the upstream end of the isolation valve, the upstream end of the isolation valve being capable of being pushed to its downstream position for opening the circuit by pressurized fluid entering through the open upstream end of the circuit, or in a second determined downstream position, called "contact" position, opening the upstream end of the circuit in which the downstream end of the dust-prevention valve pushes an upstream end of the movable isolation valve in order to move the isolation valve by contact to its downstream position for opening the circuit and in that the dust-prevention valve comprises one or more passageways for guiding at least a portion of the stream of fluid traveling from upstream to downstream through the body of said dust-prevention valve.

Therefore, according to the invention, the movable dust-prevention valve slides in the internal circuit of the filler coupling and forms a screen between the filler tool (filler connector) and the isolation valve.

Such an arrangement also makes it possible to improve the reliability and the safety of the filler system. Specifically, the dust-prevention valve guides and forces the incoming gas stream during filling when it travels downstream. The passageway ducts passing through the dust-prevention valve can notably make it possible to reduce the turbulence of the gas when filling. In this manner, the generated vibrations are also reduced. The convergence of the stream or streams passing through the dust-prevention valve notably makes it possible to accelerate the stream of gas and to concentrate it on a central zone of the passageway, notably at the opening of the seat (the upstream portion of the downstream isolation valve). This configuration makes it possible at least partly to save the valve spring from the filling gas stream. This guidance of the filling gas may also make it possible to direct the stream of gas toward the zone forming the seat for the downstream isolation valve, which promotes its being cleaned on each fill. This makes it possible to reduce the risks of leaks due to a dirty isolation valve seat.

The configuration therefore makes it possible to significantly improve the safety of the bottle during its multiple fills.

This architecture also makes it possible to protect the isolation valve during successive filling operations.

In this manner, in the closed position, the upstream dust-prevention valve protects the downstream isolation valve from dust, but also protects the downstream isolation valve from direct contact with the end of a filler connector.

Moreover, this architecture with double movable valves in series sliding on one and the same axis forms an effective protective mechanism in a filling process allowing improved protection of the downstream isolation valve.

The arrangement of two valves in series makes it possible to effectively interact with a determined packaging connector.

In particular, the sliding dust-prevention valve can allow opening of the upstream of the coupling while
  protecting the downstream isolation valve from particles and
  allowing the actuation of this downstream isolation valve by mechanical contact.

The arrangement of the upstream dust-prevention valve and of the downstream isolation valve also interacts easily with packaging connectors opening the downstream isolation valve via a stream of pressurized gas delivered into the coupling (instead of a mechanical contact).

Moreover, the dust-prevention valve regulates the incoming gas stream during filling because the gas is forced through the body of the dust-prevention valve. Advantageously this regulates the gas stream to the downstream portion while minimizing the turbulence that is harmful for the mechanics of the isolation valve.

The in series arrangement of the double-valve coupling thus provides a high level of protection of the isolation valve against dirt and offers opening sequences that are suitable for various types of filling.

The invention provides great safety in the opening/closing sequences of the filler coupling. Moreover, filling according to the invention keeps the coupling sealed throughout the life of the coupling.

Therefore, for example, and without being limiting, the upstream dust-prevention valve can advantageously participate in the mechanical opening of the downstream isolation valve by transmitting an opening force from upstream to downstream. That is to say, in certain filling configurations, the dust-prevention valve can form a member for transmitting movement between a packaging connector and the downstream isolation valve.

Similarly, the movable dust-prevention valve can ensure an opening of the upstream of the coupling allowing the downstream isolation valve to be opened with the pressure of the filling gas (as a function of the pressures and setting of the valves).

The upstream dust-prevention valve can therefore perform the following functions:
  the opening/closing of the upstream of the circuit,
  the guiding of the fluid stream upstream of the fluid isolation valve during a filling process, and, optionally,
  the transmission of mechanical movement in order to selectively control the opening or closing of the downstream isolation valve.

According to possible particular features:
  the body of the dust-prevention valve slides in the circuit,
    the passageway or passageways constricting the totality or virtual totality of the fluid stream travelling from upstream to downstream in the circuit to travel through the body of the dust-prevention valve irrespective of the downstream position of the dust-prevention valve,
  the passageway or passageways comprise at least one convergent portion for guiding at least a portion of the gas traveling through the dust-prevention valve to the central portion of the internal filler circuit,
  the passageway or passageways converge and guide at least a portion of the gas traveling through the dust-prevention valve in a parallel manner into the central portion of the internal filler circuit,
  the passageway or passageways converge to guide at least a portion of the gas traveling through the dust-prevention valve to the central portion of the upstream end of the isolation valve,
  the passageway or passageways converge in order to guide at least a portion of the gas traveling through the dust-prevention valve to a convergent zone of the internal filler circuit defining the seat of the isolation valve,
  the isolation valve can be moved selectively into a downstream position for opening the circuit by mechanical actuation carried out by the dust-prevention valve,
  the isolation valve can be moved selectively into a downstream position for opening the circuit by a pressurized fluid stream,
  the dust-prevention valve can be selectively moved downstream by a mechanical actuation and/or by pressurized fluid,
  the external and/or internal surface of the body of the coupling comprises stampings forming attachment recesses and/or reliefs designed to interact with paired shapes of a packaging connector to form a selective mechanical attachment system, notably a quick connection system,
  the dust-prevention valve comprises an upstream end that can be actuated mechanically and/or via pressurized fluid,
  the movable isolation valve comprises a flexible sealing gasket designed to interact with the seat in order to achieve the sealed closure of the circuit when the valve is moved against the seat with a determined pressure,
  in the upstream position for closing the upstream end of the circuit, said dust-prevention valve closes off in a sealed manner the inlet orifice of the circuit upstream end, for example, in a watertight manner,
  in the upstream position for closing the upstream end of the circuit, said dust-prevention valve closes off in an unsealed manner the inlet orifice of the circuit upstream end,
  the body of the coupling and/or the dust-prevention valve comprises a flexible lip forming a watertight barrier between the body of the coupling and the dust-prevention valve at least when the latter is in the upstream closed position,
  the flexible lip comprises a free end allowing a gas or liquid to pass when a determined pressure differential exists on either side of the lip, in order notably to allow a possible discharge of gas from downstream to upstream, for example in the event of leakage of the isolation valve,
  in the upstream position of the dust-prevention valve, the upstream end of the dust-prevention valve recloses the upstream end of the circuit in a flush manner at the upstream end of the body of the coupling,
  the body of the dust-prevention valve slides in a sealed manner in the circuit, the sealing between the dust-prevention valve and the body of the coupling is achieved by metal/metal contact and/or via at least one seal, the passageway(s) comprise one or more internal ducts passing through the body of the dust-prevention valve and/or passing through the body of the coupling, the passageway(s) comprise at least one space between the dust-prevention valve and the body of the coupling in order to force all or virtually all of the fluid stream passing from upstream to downstream in the circuit to pass through the dust-prevention valve, the return member moving the isolation valve to its upstream position comprises at least one of the following: a compression spring, a tension spring, the return member moving the dust-prevention valve to its upstream position comprises at least one of the following: a compression spring, the downstream end of the dust-prevention valve comprises a rod for mechanically actuating the upstream end of the isolation valve, the upstream end of the isolation valve comprises a surface designed to interact in mechanical contact with the downstream end of the dust-prevention valve, the isolation valve is closed before the closure of the dust-prevention valve, the seat of the isolation valve is formed by a shoulder of a tubular frame secured to the body of the coupling, the isolation valve sliding in this frame, the downstream end of the dust-prevention valve entering said frame when the dust-prevention valve comes into the downstream position, the coupling comprises an abutment designed to interact with the dust-prevention valve in order to limit the maximum downstream position of the latter, the abutment designed to interact with the dust-prevention valve in order to limit the maximum downstream position of the latter is secured to the body of the coupling and/or to a frame secured to the body and defining the seat of the isolation valve, the isolation valve comprises a nonreturn mechanism generating a force on the isolation valve and moving upstream when the latter is subjected to a fluidic pressure in its upstream portion, the nonreturn mechanism comprises a channel connecting the upstream end of the isolation valve to a downstream chamber in order to convert a fluidic pressure on the upstream portion of the valve into a force on the downstream end of the isolation valve tending to move said isolation valve into an upstream closed position, the nonreturn mechanism ("NRV") comprises a determined surface-area ratio between, on the one hand, the upstream end of the isolation valve subjected to an upstream fluid and, on the other hand, the downstream end of the isolation valve communicating with the chamber, in order to move said isolation valve into an upstream closed position when its upstream end is subjected to pressurized fluid.

The invention also relates to a tap for pressurized fluid, in particular for pressurized gas, with or without pressure relief valve, comprising a filler coupling designed to interact with a packaging connector in order to allow the filling of said receptacle via said coupling, the filler coupling conforming with any one of the features above or below.

The invention also relates to a pressurized fluid receptacle, in particular a pressurized gas bottle, comprising a tap conforming with any one of the features above or below.

The invention also relates to a method for filling such pressurized gas receptacle conforming by means of a packaging connector mechanically connected in a removable manner to said connector for filling the receptacle, the method comprising a first step of moving the dust-prevention valve downstream in order to open the upstream end of the circuit via a mechanical actuation and/or a fluidic actuation carried out by the packaging connector and a second step of moving the isolation valve to a downstream opening position via a mechanical actuation carried out by the dust-prevention valve and/or via a fluidic actuation carried out by the gas delivered by the packaging connector.

According to other possible particular features, during the first step, the dust-prevention valve is moved into its first determined downstream position, called "contactless" position, and in that, in the second step, the isolation valve is moved to an open downstream position via a fluidic actuation carried out by the gas delivered by the packaging connector, during the first step, the dust-prevention valve is moved into its second determined downstream position, called "contact" position, and in that, in the second step, the isolation valve is moved to an open downstream position via a mechanical actuation carried out by the dust-prevention valve, the dust-prevention valve is moved downstream by a mechanical action of an end of a valve driver belonging to the packaging connector, at the end of the process for filling a pressurized gas receptacle, the isolation valve is automatically closed when the mechanical force and/or the fluidic force exerted on the upstream portion of the valve becomes less than a determined threshold, the filling method comprises a first step of moving the dust-prevention valve to a downstream position for opening the upstream end of the circuit via a mechanical actuation and/or a fluidic actuation carried out by the packaging connector and a second step of moving the isolation valve to a downstream opening position via a mechanical actuation carried out by the dust-prevention valve, the valve or valves can be opened independently of the mechanical attachment of the packaging connector to the coupling, in particular, the valve or valves can be opened by the packaging connector after the mechanical attachment of the packaging connector to the coupling and via a distinct actuation of the attachment system, the packaging connector designed to interact with a filler coupling of a pressurized fluid receptacle tap comprises at least one gripper extending in a longitudinal direction about a longitudinal axis, the central space situated between the gripper or grippers and the longitudinal axis forming a housing designed to accommodate a filler coupling of generally cylindrical shape, the internal face of the at least one gripper situated facing the central space comprising reliefs and/or recesses of determined dimensions, the reliefs and/or recesses being spaced relative to one another in a determined manner in order to fit into grooves and/or paired reliefs formed on the external face of a filler coupling, the at least one gripper being able to move transversely relative to the longitudinal axis between a position called "outspread" in order to allow the insertion of a coupling into the central space and a position called "closed" to allow the fitting of the internal face of the grippers on the external face of a coupling, said connector comprising a locking member that can move between an active position immobilizing the grippers in the closed position and an inactive position allowing the grippers to move toward the outspread position.

The invention may also relate to any alternative device or method comprising any combination of the features above or below.

BRIEF DESCRIPTION OF THE FIGURES

Other particular features and advantages will appear on reading the following description made with reference to the drawings in which:

FIG. 8 represents an enlarged view in section of a detail of the upstream end of a filler coupling illustrating another possible exemplary embodiment of the upstream valve in the closed position)

DETAILED DESCRIPTION OF THE INVENTION

Figure 1:
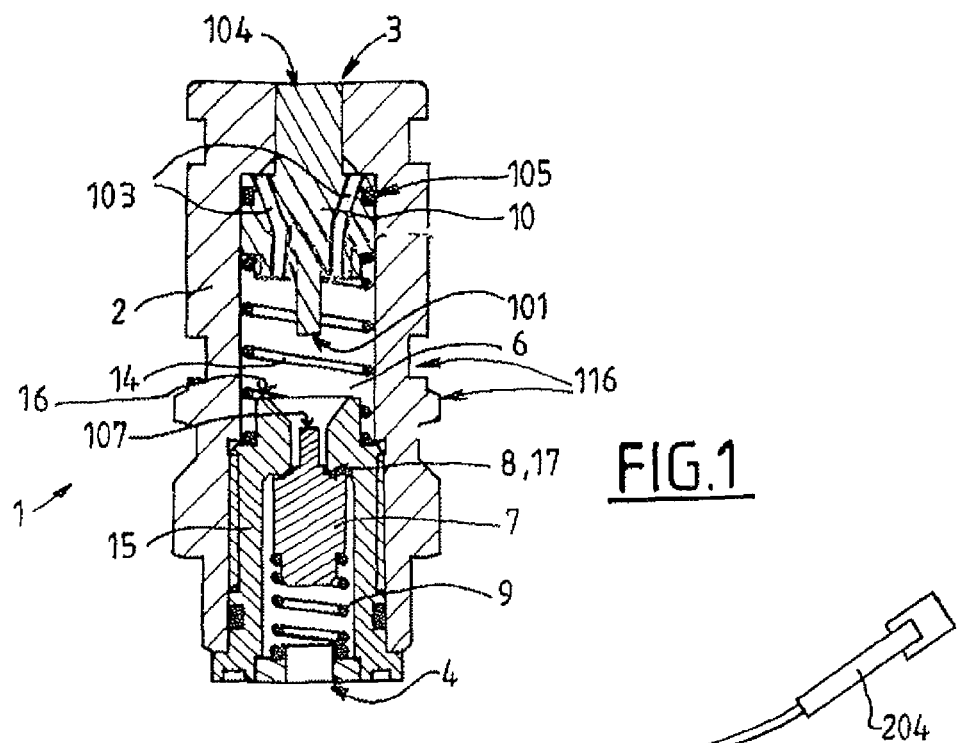
FIG. 1 represents a schematic view in section illustrating a first exemplary embodiment of a filler coupling according to the invention in a closed position.

Now with reference to FIG. 1, the filler coupling 1 comprises a body 2, for example of generally cylindrical shape. The body 2 defines an internal filling circuit 6 between an upstream end 3 designed to be connected to a packaging connector and a downstream end 4 designed to be connected to a pressurized gas receptacle (via for example an internal circuit of a tap).

The upstream end 3 of the circuit 6 (and of the coupling 1) can be selectively closed by a dust-prevention valve 10 which can move in the body 2 of the coupling.

The dust-prevention valve 10 can be selectively moved in the body 2 (preferably in translation) between an upstream position for closing the upstream end 3 of the circuit 6 and a downstream position for opening the circuit upstream end 3. Preferably, the dust-prevention valve 10 is moved to its upstream position by a return member 14, for example a spring such as a compression spring.

Preferably, in the upstream position for closing the upstream end 3 of the circuit 6, the dust-prevention valve 10 is housed in the body 2 of the coupling and is flush with the end surface of the body 2 of the coupling 1.

The dust-prevention valve 10 closes the upstream inlet 3 of the circuit in a sealed or unsealed manner by contact with the body 2 of the coupling 1. The body of the dust-prevention valve 10 may comprise one or more seals 105 closing off the circuit 6 in a sealed manner.

The dust-prevention valve 10 may comprise one or more passageways 103 guiding at least a portion and preferably all of the fluid stream travelling from upstream 3 to downstream 4 through the body of the dust-prevention valve 10. That is to say that, when a gas travels from upstream 3 to downstream 4, the passageway(s) 103 force the totality or the virtual totality of the gas stream to pass through the body of the dust-prevention valve 10 irrespective of the downstream position of the dust-prevention valve 10. The passageways 103 may comprise internal ducts passing through the body of the valve 10. As a variant or in combination, it is possible to envisage ducts or passageways passing through the body 2 of the coupling 1. Similarly, as a variant or in combination, it is possible to envisage one or more passageways 103 formed by a spacing between the dust-prevention valve 10 and the body 2 of the coupling. As a variant or in combination when the dust-prevention valve 10 opens the upstream end 3 of the circuit 6, the pressurized gas travels downstream bypassing the dust-prevention valve 10 (that is to say that the gas passes between the dust-prevention valve 10 and the body 2 of the coupling).

Downstream of the dust-prevention valve 10, the circuit 6 contains an isolation valve 7 that can move relative to a seat 8. The isolation valve 7 can be moved preferably in translation between an upstream position for closing the circuit and a downstream position for opening the circuit. The isolation valve 7 is moved by default toward its upstream position by a return member 9 such as a spring notably a compression spring.

As shown, the isolation valve 7 may comprise a flexible sealing gasket 17 designed to interact with the seat 8. The flexible gasket may contain plastic, a polymer, a cured elastomer or any other appropriate material.

As shown, without it being necessary, the seat 8 of the isolation valve 7 can be formed by an annular shoulder secured to a tubular frame 15 fixed in the body 2 of the coupling (for example by sealed screwing).

For example, the isolation valve 7 slides in this frame 15. One end 16 of this frame 15 or of the seat 8 can for example form an abutment 16 designed to interact with the dust-prevention valve 10 to limit the maximum downstream position of the latter. Similarly, the spring 14 of the dust-prevention valve can rest on this frame 15.

Therefore, the dust-prevention valve 10 comprises an upstream end or surface 104 that can be actuated mechanically (that is to say by mechanical contact) and/or via pressurized fluid.

Figure 2:
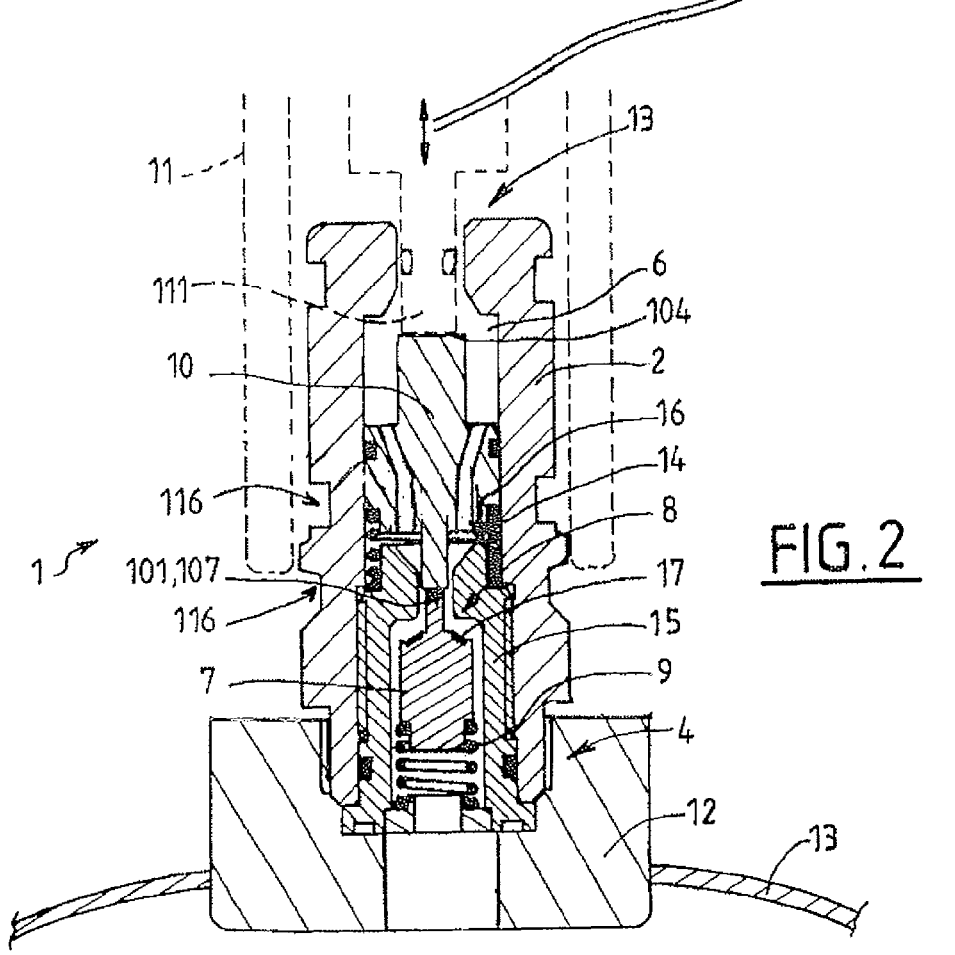
FIG. 2 represents a schematic and partial view in section illustrating the filler coupling of FIG. 1 mounted on a receptacle tap in a position opened by the action of a packaging connector.

In FIG. 2, the coupling 1 is shown schematically on a tap 12 of a receptacle 13. Moreover, a packaging connector 11 opening the coupling 1 is shown symbolically in dashed lines.

Preferably, the external surface of the body 2 of the coupling 1 comprises stampings 116 forming attachment recesses and/or reliefs designed to interact with paired shapes of a packaging connector 11 in order to form a mechanical attachment system, notably a quick connection system (not shown in detail). In particular, preferably the stampings 116 are of a dimension and are positioned according to a determined geometry preferably in order to fit a determined paired packaging connector 11 (and only that connector).

As shown in FIG. 2, the dust-prevention valve 10 can be moved selectively downstream by a mechanical actuation, for example by a valve driver 111 that can be moved selectively in response to an actuator such as a pivoting lever 204 for example. The movement of the valve driver 111 can be obtained also automatically, for example pneumatically and/or by an electromechanical system.

The valve driver 111 is preferably inserted into the coupling in a sealed manner and delivers pressurized gas via an internal or external channel to the valve driver 111 (not shown).

As can be seen in FIG. 2, when the dust-prevention valve 10 is brought to a determined downstream position called the "contact" position (with the upstream end 3 open), a downstream end 101 of the dust-prevention valve 10 pushes an upstream end 107 of the isolation valve 7 in order to move the isolation valve 7 toward its downstream position for opening the circuit 6.

That is to say that the isolation valve 7 can be moved selectively into a downstream position for opening the circuit by mechanical actuation carried out by the dust-prevention valve 10.

Accordingly, as shown in the figures, the dust-prevention valve 10 may comprise a downstream end 101 in the form of a rod the terminal surface of which is designed to mechanically actuate the upstream end of the isolation valve 7. The upstream end of the isolation valve 7 may also be formed by a rod which protrudes in the upstream direction relative to the seat 8 of generally annular shape.

Figure 3:
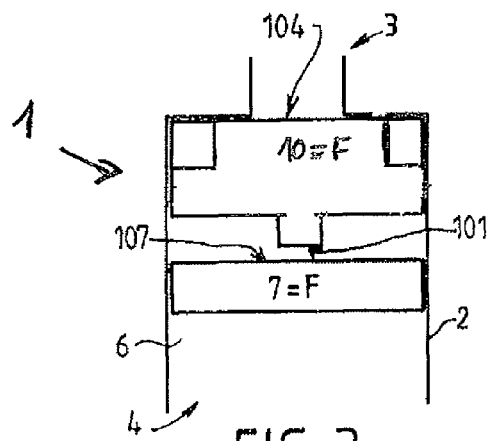
FIG. 3 represents a schematic and partial view in section illustrating the structure of a filler coupling according to the invention in a closed position (two valves closed)
Figure 4:
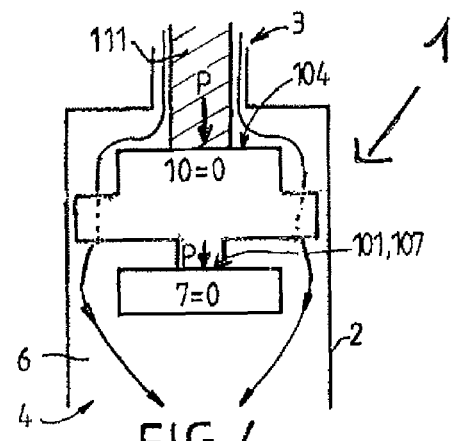
FIG. 4 represents the filler coupling of FIG. 3 in an open position (two valves opened by mechanical contact)

Therefore, from a closed position (dust-prevention valve 10 closed F and isolation valve closed F) illustrated schematically in FIG. 3, a packaging connector 11 can mechanically push the upstream end 104 of the dust-prevention valve 10 (pressure P). The dust-prevention valve 10 is moved in the downstream direction. The inlet of the circuit 6 of the coupling 2 is open (FIG. 4). The downstream end 101 of the dust-prevention valve 10 in its turn pushes the upstream end 107 of the isolation valve 7 (mechanical pressure P) which then opens the downstream end of the circuit 6. The stream of pressurized gas can travel from upstream to downstream (symbolized by the arrows).

Figure 5:
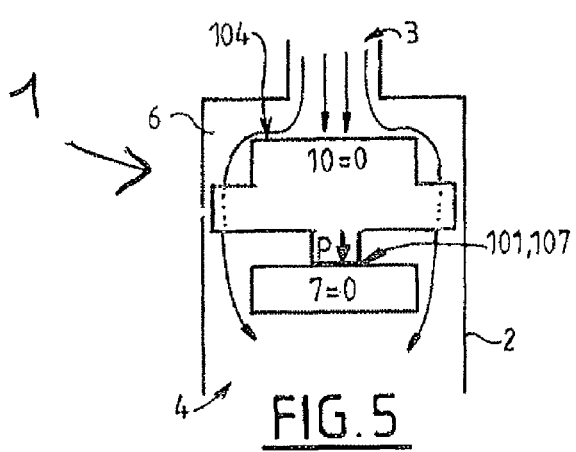
FIG. 5 represents the filler coupling of FIG. 3 in an open position (two valves opened respectively by gas pressure and by mechanical contact)

Naturally, this method of opening and of filling is not limited to this example. Therefore, as shown in FIG. 5, depending on the filling conditions, the upstream end 104 of the dust-prevention valve 10 can be pushed in the downstream direction by the gas stream itself (symbolized by arrows). The downstream end 101 of the dust-prevention valve 10 can then mechanically push (pressure P) the isolation valve 7.

Figure 6:
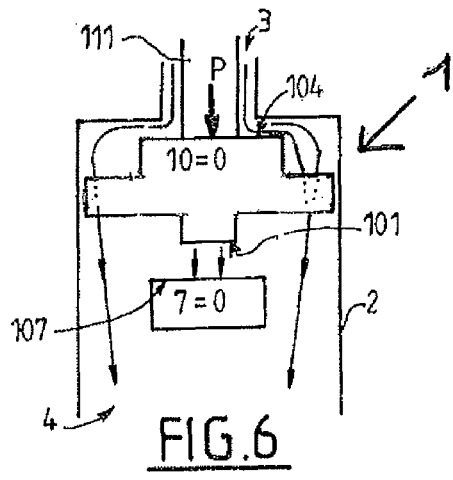
FIG. 6 represents the filler coupling of FIG. 3 in an open position (two valves opened respectively by mechanical contact and by gas pressure)

In the variant of FIG. 6, the dust-prevention valve 10 is opened (O) mechanically by a packaging connector 11 (pressure P) but the isolation valve 7 is opened (O) not by the downstream end 101 of the dust-prevention valve 10 but by the force exerted by the pressure of the incoming gas.

Figure 7:
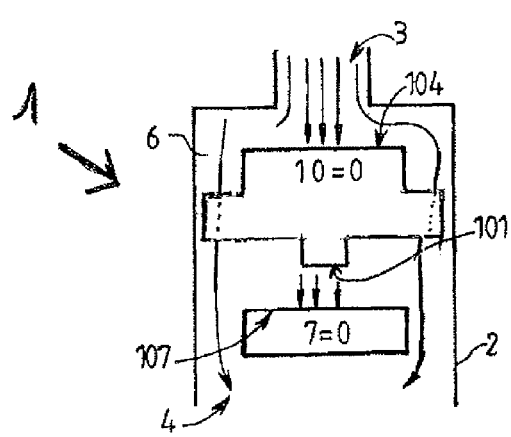
FIG. 7 represents the filler coupling of FIG. 3 in an open position (two valves opened by gas pressure)

In the variant of FIG. 7, the dust-prevention valve 10 and the isolation valve 7 are opened (O) by the force exerted by the pressure of the filling gas.

Therefore, it is easy to understand that, depending on the geometry of the filling connector and the filling conditions (notably the flow rate and the pressure of the filling gas inserted into the coupling by the filling connector 11), the two valves 10, 7 in series can be opened (moved in the downstream direction) by a mechanical contact and/or by the pressure of the filling gas.

This confers great flexibility of use on the coupling according to the invention. Specifically, filling with gas in all cases ensures protection of the isolation valve 7.

Moreover, the opening of the coupling when filling can be obtained by a sequential opening of the two valves 10, 7 in series (first the dust-prevention valve 10, then the isolation valve 7).

At the end of a filling process of a pressurized gas receptacle, the isolation valve 7 is closed automatically by the action of the spring 9 when the mechanical and/or fluidic force exerted on the upstream portion of the valve 7 falls below a determined threshold. At the end of the filling operation, the isolation valve 7 is closed in principle before the dust-prevention valve 10 is closed.

The structure according to the invention also makes it possible to put in place filling procedures that are particularly effective in terms of safety for the operators carrying out the filling and for the end users of the tap fitted with such a coupling.

Therefore, for example, the movable dust-prevention valve 10 adopts, during its movement, at least two sealed positions making it possible to ensure secure filling.

In a first sealed position, the dust-prevention valve 10 is moved in the downstream direction and opens the upstream of the circuit 6 without the isolation valve 7 being opened (see FIG. 10). In this open position (O) of the upstream valve 10 and the closed position (F) of the downstream valve 7, the chamber situated upstream of the isolation valve 7 can be evacuated (determined low pressure) for example by a filling tool in order to carry out tests prior to filling. In this configuration, it is actually possible to measure any leaks originating from the isolation valve 7.

In another sealed position, the isolation valve 7 can also be opened in order to carry out a filling and/or to carry out a possible emptying of the circuit 6 and of the bottle before filling (see for example the configuration of FIG. 4, but with a gas stream reversed in the event of draining).

At the end of filling, the isolation valve 7 can be closed again and the dust-prevention valve 10 can be kept open (see FIG. 10) to carry out possible sealing tests at the end of filling such as those described above prior to filling.

These filling methods make it possible to ensure safe filling and the maintained sealing of the coupling after many fills.

Figure 9:
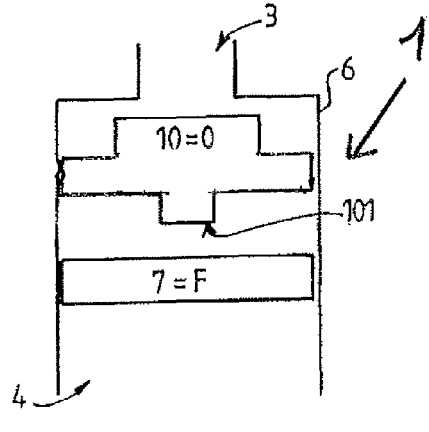
FIG. 9 represents the filler coupling of FIG. 3 in a closed test position (upstream valve open and downstream valve closed).

The variant of FIG. 9 differs from that of FIG. 1 only in that the body 2 of the coupling 1 comprises a flexible lip 27 the free end of which interacts with the dust-prevention valve 10 in order to form a watertight barrier between the body 2 of the coupling and the dust-prevention valve 10 (at least when the latter is in the upstream closed position).

The flexible lip 27, which preferably has an annular shape around the dust-prevention valve 10, is for example made of elastomer fitted or cured onto the body 2.

The flexibility of the lip 27 is designed to prevent ingress of water in the downstream direction while all the same allowing fluid (gas notably) to pass in the event of determined pressure (notably in the event of leakage of the isolation valve 7).

The use of this coupling on gas taps preferably furnished with pressure relief valves offers many advantages. Specifically, the gas receptacles (bottles for example) furnished with such taps can be filled in total safety and can retain one and the same filler coupling without endangering the seal of the coupling.

The filling method according to the invention therefore makes it possible to improve the protection of the sealing valve gasket from contamination (metal particles, dust etc.) via the movable filter that is moved during filling.

This makes it possible to increase the reliability of the seal of the coupling throughout the life of the tap and of the bottle fitted therewith.

According to the invention, the mechanical pushing of the isolation valve 7 remains possible although solely via the dust-prevention valve 10.

The filling method according to the invention therefore makes it possible to improve the safety of filling via the actuation of the in-series double-valve mechanism described above.

Advantageously the invention applies to the filler couplings and filling systems for pressurized gas bottles, for example between 150 and 750 bar, fitted with taps with integrated relief valves or with removable relief valves.

The filler coupling may if necessary also be the gas drainage coupling.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A filler coupling for a pressurized gas receptacle designed to interact with a packaging connector in order to allow said receptacle to be filled, the filler coupling comprising
   a) a body defining an internal filler circuit between an upstream end designed to be connected to a packaging connector and a downstream end designed to be connected to a receptacle, the coupling comprising
      i) an isolation valve that can move relative to a seat between an upstream position configured to close the internal filler circuit and a downstream position configured to open the internal filler circuit,
      said isolation valve being configured to be capable of being moved to its upstream position by a return member,
   b) a dust-prevention valve upstream of the isolation valve, said dust-prevention valve comprising
      ii) a downstream end and being able to move relative to the body between an upstream position configured to close the upstream end of the internal filler circuit and a downstream position configured to open the internal filler circuit upstream end,
      said dust-prevention valve being configured to be capable of being moved to its upstream position by a return member,
wherein the dust-prevention valve is capable of being moved selectively downstream either:
   a) in a first determined downstream position, called "contactless" position, configured to open the upstream end of the internal filler circuit,
   wherein the downstream end of the dust-prevention valve is configured in a position wherein the dust-prevention valve is not pushing the upstream end of the isolation valve, and
   wherein the upstream end of the isolation valve is capable of being pushed to its downstream position for opening the circuit by the pressurized fluid entering through the open upstream end of the internal filler circuit, or
   b) in a second determined downstream position called "contact" position configured to open the upstream end of the internal filler circuit
   wherein the downstream end of the dust-prevention valve is configured in a position wherein the dust-prevention valve pushes on an upstream end of the movable isolation valve and the internal filler circuit is in an open configuration and
   wherein the dust-prevention valve comprises one or more passageways adapted to guide at least a portion of the stream of fluid traveling from upstream to downstream through the body of said dust-prevention valve.

2. The coupling of claim 1, wherein the body of the dust-prevention valve is capable of sliding in the circuit and wherein the passageway or passageways are adapted to direct all or substantially all of the fluid stream travelling from upstream to downstream in the internal filler circuit to travel through the body of said dust-prevention valve irrespective of the downstream position of the dust-prevention valve.

3. The coupling of claim 1, wherein the passageway or passageways comprise at least one convergent portion adapted to direct at least a portion of the fluid stream passing through the dust-prevention valve to the central portion of the internal filler circuit.

4. The coupling of claim 1, wherein the passageway or passageways converge and are adapted to guide at least a portion of the fluid stream passing through the dust-prevention valve in a parallel manner into the central portion of the internal filler circuit.

5. The coupling of claim 1, wherein the passageway or passageways converge are adapted to guide at least a portion of the fluid stream passing through the dust-prevention valve to the central portion of the upstream end of the isolation valve.

6. The coupling of claim 1, wherein the passageway or passageways converge and are adapted to guide at least a portion of the fluid stream passing through the dust-prevention valve to a convergent zone of the internal filler circuit defining the seat of the isolation valve.

7. The coupling of claim 1, wherein the isolation valve is capable of being moved selectively into a downstream position by a mechanical actuation carried out by the dust-prevention valve.

8. The coupling of claim 1, wherein the isolation valve is capable of being moved selectively into a downstream position by a pressurized fluid stream.

9. The coupling of claim 1, wherein the dust-prevention valve is capable of being selectively moved downstream by a mechanical actuation and/or by pressurized fluid.

10. A tap for pressurized fluid, comprising the filler coupling of claim 1 and adapted to interact with a packaging connector to allow the filling of said receptacle via said coupling.

11. A pressurized fluid receptacle, in particular a pressurized gas bottle, comprising a tap as claimed in claim 10.

12. A method for filling a pressurized gas receptacle as claimed in claim 11 through a packaging connector mechanically connected in a removable manner to said connector for filling the receptacle, wherein the method comprises
   a) a first step of moving the dust-prevention valve downstream in order to open the upstream end of the circuit via a mechanical actuation and/or a fluidic actuation carried out by the packaging connector and
   b) a second step of moving the isolation valve to a downstream opening position via a mechanical actuation carried out by the dust-prevention valve and/or via a fluidic actuation carried out by the gas delivered by the packaging connector.

13. The method of claim 12, wherein, during the first step, the dust-prevention valve is moved into its first determined downstream position, called "contactless" position, and in that, in the second step, the isolation valve is moved to an open downstream position via a fluidic actuation carried out by the gas delivered by the packaging connector.

14. The method of claim 13, wherein, during the first step, the dust-prevention valve is moved into its second determined downstream position, called "contact" position, and in that, in the second step, the isolation valve is moved to an open downstream position via a mechanical actuation carried out by the dust-prevention valve.

15. The method of claim 11, wherein the dust-prevention valve is moved downstream by a mechanical action of an end of a valve driver belonging to the packaging connector.

* * * * *